United States Patent
Henderson, Jr. et al.

(10) Patent No.: US 8,920,276 B2
(45) Date of Patent: Dec. 30, 2014

(54) CONTROLLER FOR VARYING GEAR RATIOS IN TRANSMISSION SYSTEM

(71) Applicant: Caterpillar Inc., Peoria, IL (US)

(72) Inventors: Russell Ross Henderson, Jr., Havana, IL (US); Abdul Karim Maoued, Peoria, IL (US); Aaron Benjamin Crabtree, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 4 days.

(21) Appl. No.: 13/785,781

(22) Filed: Mar. 5, 2013

(65) Prior Publication Data

US 2014/0256491 A1    Sep. 11, 2014

(51) Int. Cl.
*F16H 47/04* (2006.01)
*F16H 47/08* (2006.01)

(52) U.S. Cl.
CPC ..................................... *F16H 47/04* (2013.01)
USPC ............................................. 475/31; 475/83

(58) Field of Classification Search
USPC ................................. 475/31, 83, 88
See application file for complete search history.

(56) References Cited

U.S. PATENT DOCUMENTS

| | | | | |
|---|---|---|---|---|
| 2,924,123 | A * | 2/1960 | Giles | 475/72 |
| 3,023,638 | A * | 3/1962 | Westbury et al. | 475/77 |
| 3,300,000 | A | 1/1967 | Stoyke | |
| 3,397,597 | A * | 8/1968 | Szekely | 475/107 |
| 5,033,994 | A * | 7/1991 | Wu | 475/73 |
| 5,618,242 | A * | 4/1997 | Wu | 475/72 |
| 6,702,701 | B2 * | 3/2004 | Phelan et al. | 475/91 |
| 7,588,509 | B1 | 9/2009 | Marsha | |
| 7,824,290 | B1 | 11/2010 | Brookins | |
| 2011/0306455 | A1 | 12/2011 | Kandeth | |
| 2012/0178564 | A1 * | 7/2012 | Vahabzadeh et al. | 475/1 |
| 2013/0309104 | A1 * | 11/2013 | Schultz et al. | 417/319 |

\* cited by examiner

*Primary Examiner* — Tisha Lewis
(74) *Attorney, Agent, or Firm* — Baker Hostetler

(57) ABSTRACT

A controller is provided for varying gear ratios in a transmission system including at least one planetary gear train disposed within a housing. The controller includes a ratio control gear set, a ratio control pump, and a relief valve. The ratio control gear set includes a sun gear, a planet carrier, and a ring gear. The planet carrier is configured to rotatably connect to an output shaft of an engine. The ring gear is configured to mesh with a sun gear of the planetary gear train. The ratio control pump includes a body configured to rigidly connect to the housing, and a rotor rigidly coupled to the sun gear of the ratio control gear set. The rotor is configured to co-act with the body to pump fluid. The relief valve is configured to restrict fluid egress from the ratio control pump.

17 Claims, 3 Drawing Sheets

CONTROLLER FOR VARYING GEAR RATIOS IN TRANSMISSION SYSTEM

TECHNICAL FIELD

The present disclosure relates to a transmission system, and more particularly to a controller for varying gear ratios in a transmission system.

BACKGROUND

Continuously variable transmissions (CVT) for engines may allow a seamless variation in gear ratio of an employed gear train. However, conventional CVT's use steel belts or friction couplings between rotating components of the gear train such that the gear ratios may be varied. These friction couplings or belts may be unable to work under heavy loads or be implemented in heavy duty applications. Moreover, such friction couplings when constructed to adapt to heavy duty applications may be bulky and of less reliability.

U.S. Pat. No. 7,588,509 relates to two parallel planetary gear sets with a common sun gear output geared to a hydraulic pump and motor system. Input is applied to both planetary gear sets in parallel. Output is from both planetary gear sets in parallel. Two planetary gear set members, one in each set, are geared to the pump and motor and are used to control the ratio of the infinitely variable gear transmission (IVGT). The displacement ratio of the pump and motor, connected to these two members, controls the ratio of the IVGT.

SUMMARY

In one aspect, the present disclosure provides a controller for varying gear ratios in a transmission system coupled to an engine and including at least one planetary gear train disposed within a housing. The controller includes a ratio control gear set, a ratio control pump, and a relief valve. The ratio control gear set includes a sun gear, a planet carrier, and a ring gear. The planet carrier is configured to rotatably connect to an output shaft of the engine and includes one or more planet gears meshed with the sun gear. The ring gear is meshed with the planet gears and configured to mesh with a sun gear of the planetary gear train. The ratio control pump includes a body and a rotor. The body is configured to rigidly connect to the housing. The rotor is rigidly coupled to the sun gear of the ratio control gear set and configured to co-act with the body to pump fluid. The relief valve is connected to the ratio control pump and configured to restrict fluid egress from the ratio control pump.

In another aspect, the present disclosure provides a continuously variable transmission system for an engine. The continuously variable transmission system includes a housing, at least one planetary gear train disposed within the housing, and a controller. The controller includes a ratio control gear set, a ratio control pump, and a relief valve. The ratio control gear set includes a sun gear, a planet carrier, and a ring gear. The planet carrier is configured to rotatably connect to an output shaft of the engine and includes one or more planet gears meshed with the sun gear. The ring gear is meshed with the planet gears and configured to mesh with a sun gear of the planetary gear train. The ratio control pump includes a body and a rotor. The body is configured to rigidly connect to the housing. The rotor is rigidly coupled to the sun gear of the ratio control gear set and configured to co-act with the body to pump fluid. The relief valve is connected to the ratio control pump and configured to restrict fluid egress from the ratio control pump.

In another aspect, the present disclosure provides a method of continuously varying a gear ratio in a transmission system coupled to an engine and including at least one planetary gear train disposed within a housing. The method includes meshing a ring gear of a ratio control gear set with a sun gear of the planetary gear train. The method further includes rigidly coupling a rotor of a ratio control pump to a sun gear of the ratio control gear set. The method further includes rigidly connecting a body of the ratio control pump to the housing. The method further includes driving a planet carrier of the ratio control gear set and a ring gear of the planetary gear train such that the rotor co-acts with the body to pump fluid. The method further includes restricting fluid egress from the ratio control pump.

Other features and aspects of this disclosure will be apparent from the following description and the accompanying drawings.

DETAILED DESCRIPTION

Figure 1:
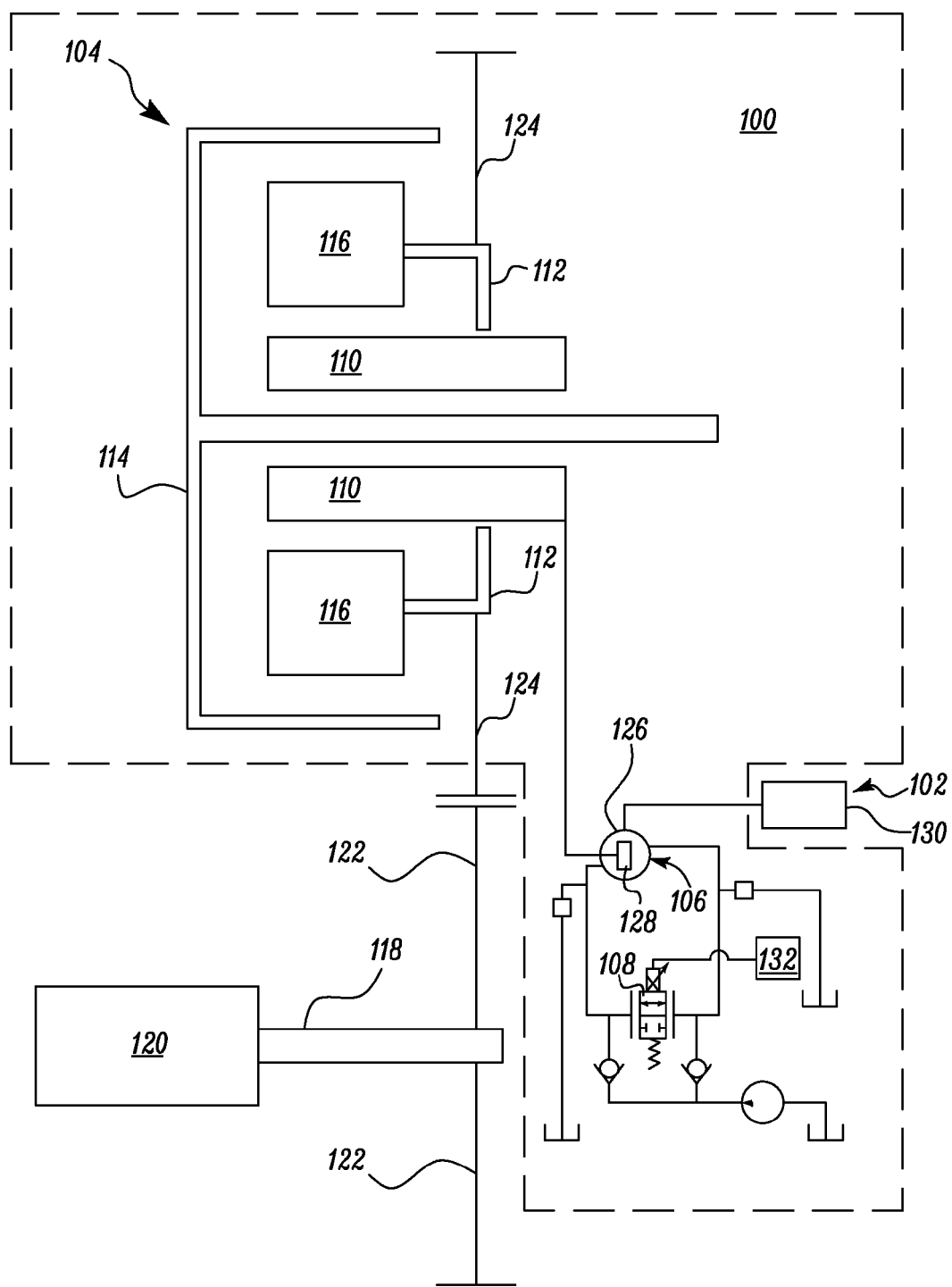
FIG. 1 is a schematic of a controller for a transmission system in accordance with an embodiment of the present disclosure.

The present disclosure relates to a controller for varying gear ratios in a transmission system. FIG. 1 shows a schematic of a controller 100 for a transmission system 102, which, in one embodiment, can be a continuously variable transmission system (CVT) 102, in which disclosed embodiments can be implemented. The controller 100 can include a ratio control gear set 104, a ratio control pump 106, and a relief valve 108. The ratio control gear set 104 includes a sun gear 110, a planet carrier 112, and a ring gear 114. The planet carrier 112 can include one or more planet gears 116 meshed with the sun gear 110. The planet gears 116 can be configured to roll over the sun gear 110 as the planet carrier 112 rotates. Further, the planet carrier 112 can be configured to rotatably connect to an output shaft 118 of an engine 120 via input gears 122, 124 while the planet gears 116 are meshed with the ring gear 114.

As shown in FIG. 1, the ratio control pump 106 can include a body 126 and a rotor 128. The body 126 can be configured to rigidly connect to a housing 130 of the transmission system 102. The rotor 128 can be rigidly coupled to rotate in unison with the sun gear 110 of the ratio control gear set 104. The rotor 128 can be configured to co-act with the body 126 to pump fluid. The relief valve 108 can be connected to the ratio control pump 106 and configured to restrict fluid egress from the ratio control pump 106. In an embodiment as shown in FIG. 1, the relief valve 108 can be a solenoid operated relief valve 108 controlled by an electronic control module (ECM) 132. The ECM 132 can be pre-set with one or more release pressure limits at which the ECM 132 may configure the relief valve 108 to open and allow fluid egress from the ratio control pump 106.

In an alternative embodiment, the ratio control pump 106 can be a variable displacement pump providing a variable fluid displacement over time. In other alternative embodiments, a secondary pump (not shown) can be connected in loop with the ratio control pump 106 thus forming a hydrostatic CVT transmission upon being implemented with a transmission system 102. In such embodiments, the secondary pump can be configured to control fluid flow from the ratio control pump 106 thus varying the fluid pressure within the ratio control pump 106.

Although it is disclosed herein that the rotor 128 of the ratio control pump 106 can be connected to the sun gear 110, and the body 126 of the ratio control pump 106 can be connected to the housing 130 of the transmission system 102, in an alternative embodiment, the ring gear 114 can be rigidly connected to the housing 130 of the transmission system 102 and the planet gears 116 can be rigidly connected to rotate the rotor 128 of the ratio control pump 106 while the sun gear 110 can be rigidly connected to rotate in unison with the output shaft 118 of the engine 120. In such an alternative embodiment, the sun gear 110 of the ratio control gear set 104 can be configured to transfer output power instead of the ring gear 114 of the ratio control gear set 104. Hence, it is to be noted that connections of the engine 120 and the ratio control pump 106 to various parts of the ratio control gear set 104 disclosed herein may change based on specific requirements of an application. A person having ordinary skill in the art having the benefit of teachings in this specification, may effect numerous modifications thereto and changes may be made without departing from the scope and spirit of the present disclosure.

In another embodiment, the ratio control gear set 104 can be a differential gear set whereby the engine 120 can rotate a first side gear of the differential gear set while a second side gear of the differential gear set can be configured to deliver output power of the engine 120. In such an embodiment, a planetary carrier of the differential gear set can be restricted by the rotor 128 of the ratio control pump 106 such that a gear ratio of the differential gear set can be varied. Thus, a scope of implementation of the controller 100 is not limited to the specific embodiments disclosed herein, but may extend to be implemented in conjunction with other types of ratio control gear sets 104 such that relatively moving parts of the ratio control gear set 104 may be restricted to vary a gear ratio of the transmission system 102.

Figure 2:
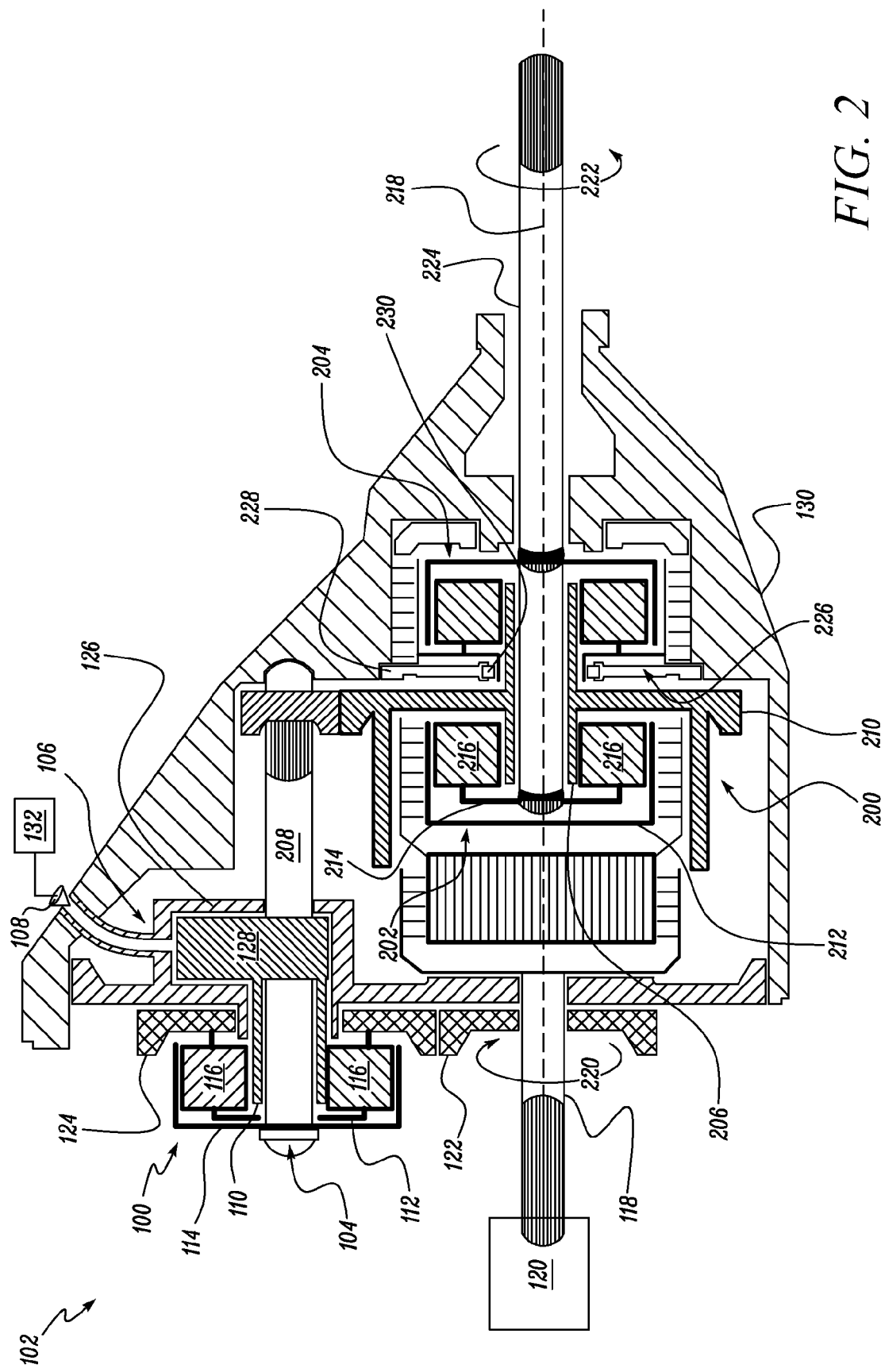
FIG. 2 is a sectional view of an exemplary continuously variable transmission system employing the controller of FIG. 1.

FIG. 2 is a sectional view of an exemplary transmission system 102 illustrated as a continuously variable transmission system (CVT) 102 employing the controller 100 of FIG. 1. The CVT 102 can include the housing 130, and at least one planetary gear train 200 disposed within the housing 130. As shown in FIG. 2, the body 126 of the ratio control pump 106 can be rigidly connected to the housing 130 of the CVT 102. In an embodiment as shown in FIG. 2, the planetary gear train 200 can be a Simpson planetary gear train including a first gear set 202, and a second gear set 204 having a common sun gear 206.

In an alternative embodiment, the gear train 200 may be a Ravigneaux planetary gear train. Although, a Simpson or Ravigneaux type of planetary gear train 200 is disclosed herein, it is to be noted that the types of gear train disclosed herein are merely exemplary in nature and hence, non-limiting of this disclosure, as other gear train configurations or types may be implemented and may form part of the CVT 102. As further provided herein, the controller 100 can be configured to vary a gear ratio of the transmission system 102.

A sun transfer shaft 208 can extend from the ring gear 114 of the ratio control gear set 104 to mesh with the common sun gear 206 of the planetary gear train 200. In an embodiment as shown in FIG. 2, the CVT 102 can include a reaction sun shell 210 rigidly connected to the common sun gear 206. In this embodiment, the sun transfer shaft 208 can mesh with the common sun gear 206 via the reaction sun shell 210. Thus, the ring gear 114 of the ratio control gear set 104 can deliver output power to oppose a load of the common sun gear 206.

In one embodiment, the first gear set 202 disclosed herein can include a front ring gear 212, and a front planet carrier 214 including front planet gears 216 rotatably mounted on the common sun gear 206. During operation, the front ring gear 212 can be driven by the engine 120 causing the front planet gears 216 to revolve thus rotating the front planet carrier 214 about a centric axis 218 in a first direction 220. However, the unconstrained common sun gear 206 may tend to rotate in a second direction 222 opposite to the first direction 220. In this scenario, the Simpson gear train may be in a basic torque multiplication mode having a gear ratio of, for example, 2.5:1, wherein two and half rotations of the output shaft 118 of the engine 120 may be required to accomplish one rotation of the front planet carrier 214 and an associated output shaft 224. The first and second directions 220, 222 disclosed herein can represent one and other of a clockwise and a counter clockwise direction.

In one embodiment, the relief valve 108 can be configured to restrict fluid egress from the ratio control pump 106 such that a rotational speed of the planetary gear train 200 can be modulated. In this embodiment, the relief valve 108 can restrict fluid egress thereby progressively increasing fluid pressure within the body 126 of the pump 106. This progressively increasing fluid pressure can proportionally constrain a relative motion between the rotor 128 and the body 126. Therefore, the reaction sun shell 210 gear or the common sun gear 206 can be proportionally restricted from rotating with respect to the front ring gear 212 thereby varying a gear ratio of the present gear train 200, illustrated as a Simpson planetary gear train. At this point, a speed of the front planet carrier 214 and the output shaft 224 can consequently increase as fluid egress is continually restricted from the ratio control pump 106. Therefore, a varying torque multiplication mode can be accomplished in the illustrated Simpson planetary gear train 200 of the CVT 102. Thus, the varying torque multiplication mode achieved by the Simpson gear train can be multiple gear ratios higher (numerically lower) than the gear ratio of the basic torque multiplication mode, for example, ratios from 2.5:1 to 1.5:1.

As restriction to the fluid egress is continued, the common sun gear 206 can be further restricted and can approach a rotating speed of the front ring gear 212. At this point, the front planet carrier 214, the common sun gear 206, and the front ring gear 212 tend to rotate as a single unit representing a direct drive mode. The direct drive mode disclosed herein can be defined as a gear ratio of 1:1 indicating that the output shaft 224 is rotating at the same speed as the output shaft 118 of the engine 120.

As provided herein, the gear ratio of the transmission system 102 can be varied, from, for example, 2.5:1 to 1:1 through 1.5:1, seamlessly upon restricting fluid egress from the control ratio pump 106; and the present transmission system 102 can thus transition from the basic torque multiplication mode to the direct drive mode via the varying torque multiplication mode. However, it is to be noted that the resistive force can be progressively increased on the rotor 128 and the common sun gear 206 until a desired gear ratio is accomplished in the Simpson gear train, or a desired speed of the output shaft 224 is achieved.

In one embodiment, the rotor 128 can be configured to slip with respect to the body 126 while the relief valve 108 selectively restricts fluid egress from the ratio control pump 106. While restricting the relief valve 108 associated with the ratio control pump 106 can cause the rotor 128 of the pump to resist being turned relative to the body 126 of the ratio control pump 106, the slip simultaneously occurring between the rotor 128 and the body 126 can allow the resistive force on the common sun gear 206 to be gradually increased. Thus, release pressure limits pre-set into the ECM 132 and an amount of slip between the rotor 128 and the body 126 of the ratio control pump 106 can together determine a rate of variation of the gear ratio within the illustrated Simpson planetary gear train 200.

It is to be understood that values of gear ratios, such as 2.5:1, 1.5:1, and 1:1, disclosed herein are merely exemplary in nature and non-limiting of this disclosure. Therefore, each of the modes disclosed herein can include a series of gear ratios and each series of gear ratios can include any number of gear ratios to constitute the a mode of operation in the Simpson gear train. In view of this, while transitioning from one mode of the Simpson gear train operation to the another, the Simpson gear train can seamlessly execute the series of gear ratios of the first mode and move to the gear ratios of the second mode.

In one embodiment, the CVT 102 can include a one-way clutch 226 configured to engage the second gear set 204 to the common sun gear 206 while the common sun gear 206 is allowed to rotate unrestricted such that a lowest (numerically higher) gear ratio can be accomplished in the CVT 102. The lowest (numerically higher) gear ratio disclosed herein can be for example, 2.5:1, and hence, can be termed as the basic torque multiplication mode. In one embodiment, the one-way clutch 226 can be a low roller clutch including a first portion 228, and a second portion 230. The first portion 228 can be rigidly attached to the housing 130. The second portion 230 can be rotatably connected to the first portion 228 and rigidly connected to the second gear set 204. In an embodiment, the one-way clutch 226 can be configured to allow rotation of the second gear set 204 with respect to a front ring gear 212 of the first gear set 202.

In another embodiment, the one-way clutch 226 can be configured to free-wheel the second gear set 204 with respect to a front ring gear 212 of the first gear set 202. Therefore, the one-way clutch 226 can be configured to engage the second gear set 204 to the unrestricted common sun gear 206 when the lowest (numerically higher) gear ratio is desired.

INDUSTRIAL APPLICABILITY

Figure 3:
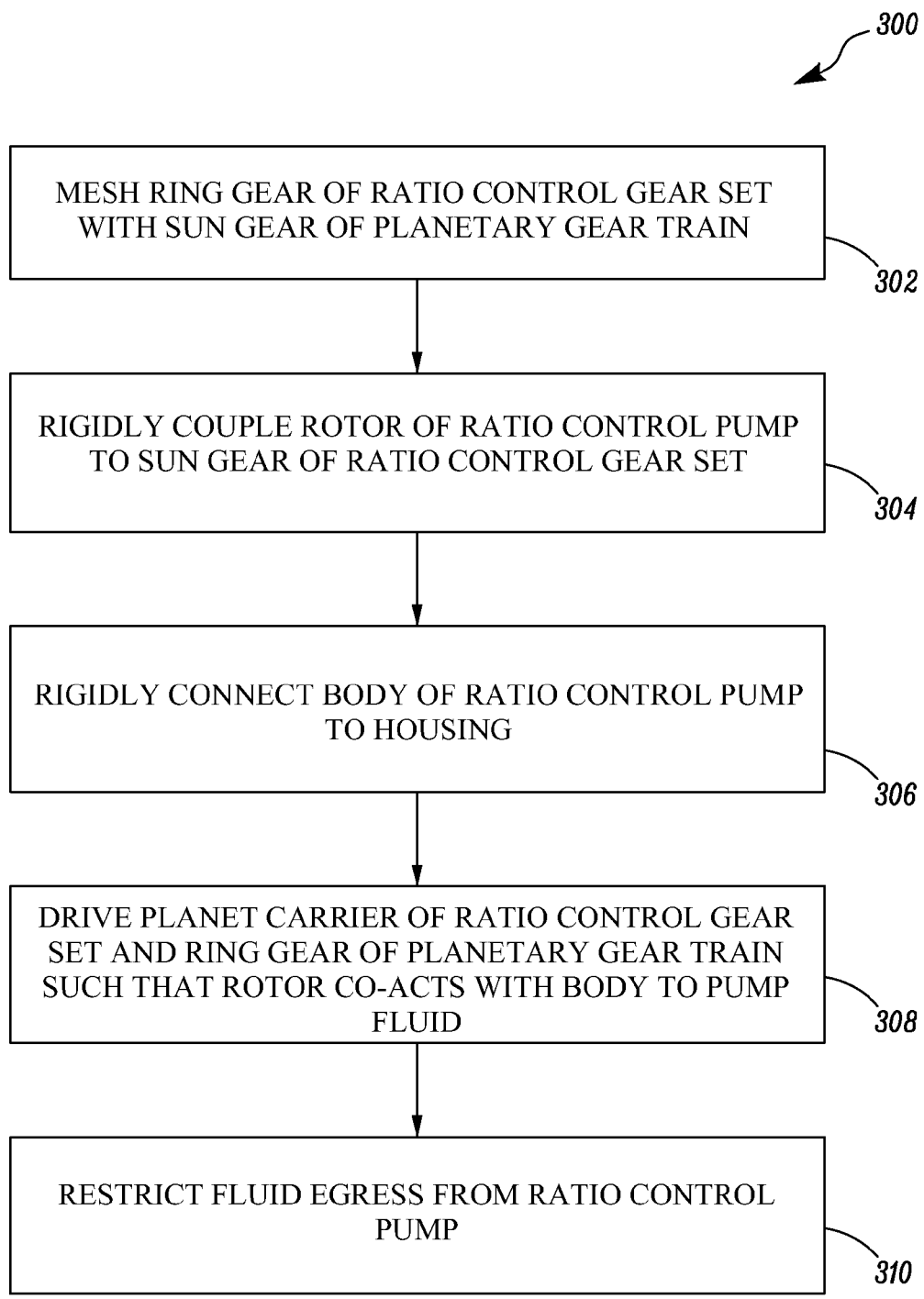
FIG. 3 shows a method of continuously varying a gear ratio of the gear train.

FIG. 3 shows a method 300 of continuously varying the gear ratio in the transmission system 102 coupled to the engine 120 and including at least one planetary gear train 200 disposed within the housing 130. At step 302, the method 300 includes meshing the ring gear of the ratio control gear set 104 with the sun gear 206 of the planetary gear train 200. At step 304, the method 300 further includes rigidly coupling the rotor 128 of the ratio control pump 106 to the sun gear 110 of the ratio control gear set 104. At step 306, the method 300 further includes rigidly connecting the body 126 of the ratio control pump 106 to the housing 130. At step 308, the method 300 further includes driving the planet carrier 112 of the ratio control gear set 104 and the ring gear 212 of the planetary gear train 200 such that the rotor 128 co-acts with the body 126 to pump fluid. At step 310, the method 300 further includes restricting fluid egress from the ratio control pump 106.

In one embodiment, the method 300 can further include modulating a rotational speed of the planetary gear train 200 while restricting fluid egress from the ratio control pump 106. The method 300 can further include slipping the rotor 128 with respect to the body 126 while selectively restricting fluid egress from the ratio control pump 106.

In one embodiment, the method 300 can further include engaging the second gear set 204 to the unrestricted common sun gear 206 by a one-way clutch 226, and additionally can include allowing rotation of the second gear set 204 with respect to the front ring gear 212 of the first gear set 202. In another embodiment, the method 300 can further include free-wheeling the second gear set 204 with respect to the front ring gear 212 of the first gear set 202 while restricting the common sun gear 206 from rotating.

Continuously variable transmissions (CVT) 102 for engines may allow a seamless variation in gear ratio of an employed gear train. However, conventional CVT's use steel belts or friction couplings between rotating components of the gear train such that the gear ratios may be varied. These friction couplings or belts may be unable to work under heavy loads or be implemented in heavy duty applications. Moreover, such friction couplings when constructed to adapt to heavy duty applications may be bulky and of less reliability.

Further, when transitioning between modes in a traditional gear train, for example, from torque multiplication mode to a direct drive mode, a speed of an employed engine may momentarily drop since a difference may occur in the gear ratios and power transferred between the first mode and the second mode. Therefore, the engine speed may not correspond to a maximum power output at a given gear ratio often making the engine lug.

The CVT 102 disclosed herein uses hydraulic pressure to resist two relatively moving components such that gear ratios may be seamlessly varied. Hence, use of mechanical couplings such as steel belts or other flexible couplings may be avoided and the issue of repair or replacement associated with such couplings may be mitigated. Therefore, the CVT 102 disclosed herein may save time, costs, and effort incurred with repairing or replacing components through the use of hydraulic pressure to vary gear ratios.

In the present CVT 102, the planetary gear train 200 may seamlessly and gradually transition from one gear ratio to another gear ratio while the fluid egress from the ratio control pump 106 is being restricted by the relief valve 108. This gradual and seamless transition in gear ratios may allow the engine 120 to stay in an optimum power band without lugging. Further, the gradual and seamless transition in gear ratios may allow a constant power transfer to a load thus driving the load. Therefore, the engine 120 employing the CVT 102 of the present disclosure may have an improved fuel mileage and service life.

While aspects of the present disclosure have been particularly shown and described with reference to the embodiments above, it will be understood that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A controller for varying gear ratios in a transmission system coupled to an engine and including at least one planetary gear train disposed within a housing, the controller comprising:
    a ratio control gear set including:
        a sun gear;
        a planet carrier including one or more planet gears meshed with the sun gear, the planet carrier configured to rotatably connect to an output shaft of the engine; and a ring gear meshed with the planet gears and configured to mesh with a sun gear of the planetary gear train; and a ratio control pump including:

a body configured to rigidly connect to the housing; and a rotor rigidly coupled to the sun gear of the ratio control gear set and configured to co-act with the body to pump fluid; and a relief valve connected to the ratio control pump and configured to restrict fluid egress from the ratio control pump, wherein the rotor is configured to slip with respect to the body while the relief valve selectively restricts fluid egress from the pump.

2. The controller of claim 1, wherein the relief valve is configured to restrict fluid egress such that a rotational speed of the planetary gear train is modulated.

3. A continuously variable transmission system for an engine, the continuously variable transmission system comprising:

a housing;

at least one planetary gear train disposed within the housing;

a controller including:

a ratio control gear set including:

a sun gear;

a planet carrier including one or more planet gears meshed with the sun gear, the planet carrier configured to rotatably connect to an output shaft of the engine; and a ring gear meshed with the planet gears and a sun gear of the planetary gear train; and a ratio control pump including:

a body configured to rigidly connect to the housing; and a rotor rigidly coupled to the sun gear of the ratio control gear set and configured to co-act with the body to pump fluid; and a relief valve connected to the ratio control pump and configured to restrict fluid egress from the ratio control pump, wherein the relief valve is configured to restrict fluid egress such that a rotational speed of the planetary gear train is modulated.

4. The continuously variable transmission system of claim 3, wherein the rotor is configured to slip with respect to the body while the relief valve selectively restricts fluid egress from the pump.

5. The continuously variable transmission system of claim 3, wherein the planetary gear train is a Simpson planetary gear train including a first gear set, and a second gear set having a common sun gear.

6. The continuously variable transmission system of claim 5 further including a one-way clutch configured to selectively engage the second gear set to the common sun gear.

7. The continuously variable transmission system of claim 6, wherein the one way clutch is configured to selectively allow a unidirectional rotation of the second gear set with respect to a front ring gear of the first gear set.

8. The continuously variable transmission system of claim 6, wherein the one-way clutch is configured to free-wheel the second gear set with respect to a front ring gear of the first gear set.

9. The continuously variable transmission system of claim 6, wherein the one-way clutch is a low roller clutch including:

a first portion rigidly attached to the housing; and a second portion rotatably connected to the first portion and rigidly connected to the second gear set.

10. The continuously variable transmission system of claim 3, wherein the planetary gear train further includes a reaction sun shell rigidly connected to the common sun gear.

11. A method of continuously varying a gear ratio in a transmission system coupled to an engine and including at least one planetary gear train disposed within a housing, the method comprising:

meshing a ring gear of a ratio control gear set with a sun gear of the planetary gear train;

rigidly coupling a rotor of a ratio control pump to a sun gear of the ratio control gear set;

rigidly connecting a body of the ratio control pump to the housing;

driving a planet carrier of the ratio control gear set and a ring gear of the planetary gear train such that the rotor co-acts with the body to pump fluid; and restricting fluid egress from the ratio control pump.

12. The method of claim 11, wherein restricting fluid egress includes modulating a rotational speed of the planetary gear train.

13. The method of claim 11 further including slipping the rotor with respect to the body while selectively restricting fluid egress from the ratio control pump.

14. The method of claim 11, wherein the planetary gear train is a Simpson planetary gear train including a first gear set, and a second gear set having a common sun gear.

15. The method of claim 14 further including selectively engaging the second gear set to the common sun gear by a one-way clutch.

16. The method of claim 14 further including selectively allowing a unidirectional rotation of the second gear set with respect to a front ring gear of the first gear set.

17. The method of claim 14, wherein the second gear set is free-wheeled with respect to a front ring gear of the first gear set.

* * * * *